US009724649B2

(12) United States Patent
Stasiak et al.

(10) Patent No.: US 9,724,649 B2
(45) Date of Patent: Aug. 8, 2017

(54) SELF-WETTING POROUS MEMBRANES (I)

(71) Applicant: PALL CORPORATION, Port Washington, NY (US)

(72) Inventors: Marcin Stasiak, Port Washington, NY (US); Hassan Ait-Haddou, Melville, NY (US)

(73) Assignee: Pall Corporation, Port Washington, NY (US)

( * ) Notice: Subject to any disclaimer, the term of this patent is extended or adjusted under 35 U.S.C. 154(b) by 168 days.

(21) Appl. No.: 14/750,382

(22) Filed: Jun. 25, 2015

(65) Prior Publication Data
US 2016/0375409 A1    Dec. 29, 2016

(51) Int. Cl.
*B01D 71/06* (2006.01)
*B01D 69/06* (2006.01)
(Continued)

(52) U.S. Cl.
CPC ........... *B01D 69/06* (2013.01); *B01D 61/246* (2013.01); *B01D 67/0013* (2013.01);
(Continued)

(58) Field of Classification Search
CPC .... B01D 69/06; B01D 67/0013; B01D 71/62; B01D 61/246; B01D 71/06; B01D 71/60;
(Continued)

(56) References Cited

U.S. PATENT DOCUMENTS 3,318,959 A    5/1967 Borman
3,847,867 A    11/1974 Heath et al.
(Continued)

FOREIGN PATENT DOCUMENTS

EP    0318787 A2    6/1989
EP    2962746 A1    1/2016
(Continued)

OTHER PUBLICATIONS

European Patent Office, Extended European Search Report issued in European Patent Application No. 16167135.9 (Oct. 27, 2016) 5 pp.
(Continued)

*Primary Examiner* — Taiwo Oladapo
(74) *Attorney, Agent, or Firm* — Leydig, Voit & Mayer, Ltd.

(57) ABSTRACT

Disclosed is a self-wetting porous membrane comprising an aromatic hydrophobic polymer such as polysulfone and a wetting agent comprising a copolymer of formula A-B or A-B-A, wherein A is a hydrophilic segment comprising a polymerized monomer of the formula (I): $CH_2=C(R^1)(R^2)$, wherein $R^1$ and $R^2$ are as described herein, and B is an aromatic hydrophobic polymeric segment, wherein segments B and A are linked through an amidoalkylthio group. Also disclosed is a method of preparing a self-wetting membrane comprising casting a solution containing an aromatic hydrophobic polymer and the wetting agent, followed by subjecting the cast solution to phase inversion. The self-wetting porous membrane finds use in hemodialysis, microfiltration, and ultrafiltration.

20 Claims, 1 Drawing Sheet

(51) Int. Cl.

| | |
|---|---|
| B01D 67/00 | (2006.01) |
| B01D 71/68 | (2006.01) |
| B01D 71/80 | (2006.01) |
| B01D 61/24 | (2006.01) |
| B01D 71/60 | (2006.01) |
| B01D 71/62 | (2006.01) |
| B29C 39/00 | (2006.01) |
| B29K 81/00 | (2006.01) |
| B29L 31/00 | (2006.01) |

(52) U.S. Cl.
CPC ......... *B01D 67/0016* (2013.01); *B01D 71/06* (2013.01); *B01D 71/60* (2013.01); *B01D 71/62* (2013.01); *B01D 71/68* (2013.01); *B01D 71/80* (2013.01); *B29C 39/006* (2013.01); *B01D 2325/36* (2013.01); *B01D 2325/38* (2013.01); *B29K 2081/06* (2013.01); *B29L 2031/755* (2013.01)

(58) Field of Classification Search
CPC .... B01D 67/0016; B01D 71/68; B01D 71/80; B01D 2325/38; B01D 2325/36; B29C 39/006; B29K 2081/06; B29L 2031/755
See application file for complete search history.

(56) References Cited

U.S. PATENT DOCUMENTS

| | | | |
|---|---|---|---|
| 4,611,048 A | | 9/1986 | Peters |
| 5,911,880 A | * | 6/1999 | Klein ................ B01D 67/0011 210/493.1 |
| 6,113,785 A | | 9/2000 | Miura et al. |
| 7,230,066 B2 | | 6/2007 | Khouri et al. |
| 7,695,628 B2 | * | 4/2010 | Steiger ................ B01D 71/68 210/500.28 |
| 2011/0240550 A1 | | 10/2011 | Moore et al. |
| 2015/0151256 A1 | | 6/2015 | Abetz et al. |

FOREIGN PATENT DOCUMENTS

| | | |
|---|---|---|
| JP | S62-201603 A | 9/1987 |
| JP | H02-160026 A | 6/1990 |
| JP | H7-19653 A | 8/1995 |
| WO | WO 2011/123033 A1 | 6/2011 |
| WO | WO 2012/047961 A1 | 4/2012 |
| WO | WO 2014/181931 A1 | 11/2014 |
| WO | WO 2015/075178 A1 | 5/2015 |

OTHER PUBLICATIONS

Intellectual Property Office of Singapore, Search Report issued in Singapore Application No. 10201603247R (Jul. 25, 2016).
Barton et al., "The effect of phenols and aromatic thiols on the polymerization of methyl methacrylate", *Canadian Journal of Chemistry*, vol. 41, No. 11, pp. 2737-2742 (1963).
Pending U.S. Appl. No. 14/750,443, filed Jun. 25, 2015.
Asif, et al., "Hydroxyl Terminated Poly(ether ether ketone) with Pendant Methyl Group-Toughened Epoxy Clay Ternary Nanocomposites: Preparation, Morphology, and Thermomechanical Properties," *Journal of Applied Polymer Science*, vol. 106, pp. 2936-2946 (2007).
Dizman, Cemil, et al., "Synthesis of polysulfone-b-polystyrene block copolymers by mechanistic transformation from condensation polymerization, to free radical polymerization," *Polymer Bulletin*, vol. 70, pp. 2097-2109 (2013).
Francis, Bejoy, et al., "Synthesis of Hydroxyl-Terminated Poly(ether ether ketone) with Pendent *tert*-Butyl Groups and Its Use as a Toughener for Epoxy Resins," *Journal of Polymer Science: Part B: Polymer Physics*, vol. 44, pp. 541-556 (2006).
Riffle, J.S., et al., "Synthesis of Hydroxyl-Terminated Polycarbonates of Controlled Number-Average Molecular Weight," *Journal of Polymer Science: Polymer Chemistry Edition*, vol. 20, pp. 2289-2301 (1982).
Wang, Jianyu, et al., "Amphiphilic ABA copolymers used for surface modification of polysulfone membranes, Part 1: Molecular design, synthesis, and characterization," *Polymer*, vol. 49, pp. 3256-3264 (2008).
Yang, Jung-Eun, et al., "Synthesis and Morphology Studies of a Polystyrene-Poly(arylene ether sulfone)-Polystyrene Coil-Semirod-Coil Triblock Copolymer," *Macromolecules*, vol. 39, pp. 3038-3042 (2006).
Yi, Zhuan, et al, "An extending of candidate for the hydrophilic modification of polysuifone membranes from the compatibility consideration: The polyethersulfone-based amphiphilic copolymer as an example," *Journal of Membrane Science*, vol. 390-391, pp. 48-57 (2012).
Yi, Zhuan, et al., "Effects of coagulant pH and ion strength on the dehydration and self-assembly of poly(N, N-dirnethylamino-2-ethyl methacrylate) chains in the preparation of stimuli-responsive polyethersulfone blend membranes," *Journal of Membrane Science*, vol. 463, pp. 49-57 (2014).
Zhang, Ying, et al., "Structure and Properties of Poly(butyl acrylate-*block*-sulfone-*block*-butyl acrylate) Triblock Copolymers Prepared by ATRP, " *Macromolecular Chemistry and Physics*, vol. 206, pp. 33-42 (2005).
Zhao, Yi-Fan, et al., "Versatile antifouling polyethersuifone filtration membranes modified via surface grafting of zwitterionic polymers from a reactive amphiphilic copolymer additive," *Journal of Colloid and Interface Science*, vol. 448, pp. 380-388 (2015).
Zhao, Yi-Fan, et al., "Improving the hydrophilicity and fouling-resistance of polysulfone ultrafiltration membranes via surface zwitterionicalization mediated by polysuifone-based triblock copolymer additive," *Journal of Membrane Science*, vol. 440, pp. 40-47 (2013).
Zhao, Yi-Fan, et al "Zwitterionic hydrogel thin films as antifouling surface layers of polyethersulfone ultrafiltration membranes anchored via reactive copolymer additive," *Journal of Membrane Science*, vol. 470, pp. 148-158 (2014).
Korean Intellectual Property Office, Notice of Non-Final Rejection issued in Korean Patent Application No. 10-2016-0051975 (dated Apr. 18, 2017) 11 pp.
Japanese Patent Office, Notice of Reasons for Rejection issued in Japanese Patent Application No. 2016-088420 (dated May 23, 2017) 6 pp.

* cited by examiner

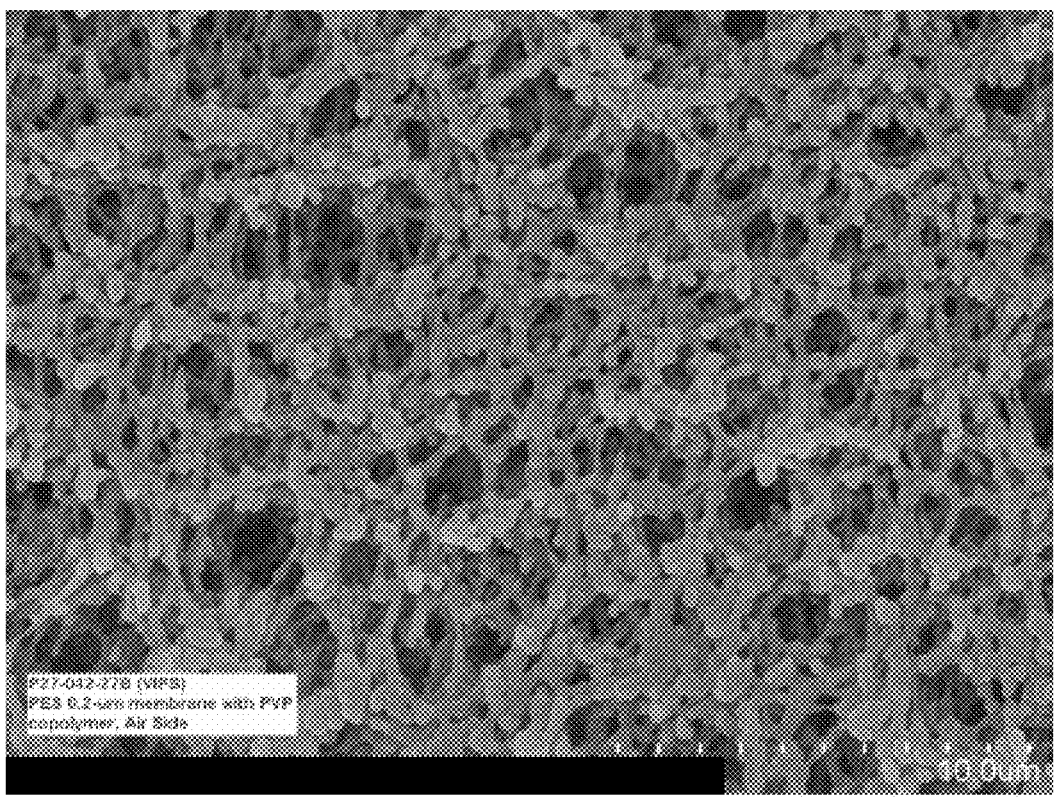

SELF-WETTING POROUS MEMBRANES (I)

BACKGROUND OF THE INVENTION

Aromatic hydrophobic polymers such as polysulfone and polyethersulfone are attractive as membrane polymers for one or more of the following reasons: a high glass transition temperatures, amorphous glassy state, thermal and oxidative stability, excellent strength and flexibility, resistance to extreme pHs, and low creep even at elevated temperatures. However, these polymers are inherently hydrophobic and therefore porous membranes made from these polymers are not wettable by water.

Attempts have been made to improve the surface wettability of porous membranes made from such polymers by numerous methods including coating and crosslinking a hydrophilic polymer, grafting of hydrophilic monomers by e-beam, gamma radiation, or UV or other radiation, surface oxidation, surface-initiated free radical grafting, blending with hydrophilic additives such as polyvinylpyrrolidone (PVP), copolymers of PVP, polyvinylalcohol (PVA), copolymers of PVA, polyethylene oxide (PEO), copolymers of PEO and polypropylene oxide, and in situ polymerization of hydrophilic monomers.

Drawbacks are associated with one or more of the above attempted methods. For example, with the methods involving blending of hydrophilic additives, the additives tend to leach out of the porous membrane on prolonged use in aqueous environments. Approaches involving coating and crosslinking a hydrophilic polymer tend to shrink or modify the membrane pores, thereby limiting the usefulness of the membranes.

The foregoing shows that there exists an unmet need for preparing porous membranes from aromatic hydrophobic polymers that would produce water wettable surfaces and the surface wettability would be stable over extended periods of use.

BRIEF SUMMARY OF THE INVENTION

The invention provides a self-wetting porous membrane comprising an aromatic hydrophobic polymer and a wetting agent comprising a copolymer of formula A-B or A-B-A, wherein A is a hydrophilic segment comprising a polymerized monomer or mixture of monomers, wherein the monomer is of the formula (I):

$$CH_2=C(R^1)(R^2) \qquad (I),$$

wherein $R^1$ is hydrogen or alkyl, and $R^2$ is selected from substituted or unsubstituted heterocyclyl, substituted or unsubstituted heteroaryl, formylamino, formylaminoalkyl, aminocarbonyl, alkylcarbonyloxy, and aminocarbonylalkyl substituted with a zwitterionic group, and B is an aromatic hydrophobic polymeric segment, wherein segments B and A are linked through an amidoalkylthio group. The invention also provides a method of preparing such a self-wetting porous membrane.

The self-wetting porous membrane of the invention has high water wettability as evidenced by its high critical wetting surface tension (CWST) in the range of from about 83 dynes/cm² to about 87 dynes/cm². The wetting additive has high degree of compatibility with the aromatic hydrophobic polymer and therefore does not leach out or leaches out only minimally. The wetting additive also distributes itself uniformly in the porous membrane.

BRIEF DESCRIPTION OF THE DRAWING

The FIGURE depicts the SEM micrograph of a self-wetting porous membrane in accordance with an embodiment of the invention illustrated in Example 10.

DETAILED DESCRIPTION OF THE INVENTION

In an embodiment, the invention provides a self-wetting porous membrane comprising an aromatic hydrophobic polymer and a wetting agent comprising a copolymer of formula A-B or A-B-A, wherein A is a hydrophilic segment comprising a polymerized monomer or mixture of monomers, wherein the monomer is of the formula (I):

$$CH_2=C(R^1)(R^2) \qquad (I),$$

wherein $R^1$ is hydrogen or alkyl, and $R^2$ is selected from substituted or unsubstituted heterocyclyl, substituted or unsubstituted heteroaryl, formylamino, formylaminoalkyl, aminocarbonyl, alkylcarbonyloxy, and aminocarbonylalkyl substituted with a zwitterionic group, and B is an aromatic hydrophobic polymeric segment, wherein segments B and A are linked through an amidoalkylthio group. "A" further comprises an end group.

The term "heterocyclyl" as used herein refers to a monocyclic heterocyclic group or a bicyclic heterocyclic group. The monocyclic heterocycle is a three-, four-, five-, six- or seven-membered ring containing at least one heteroatom independently selected from the group consisting of O, N, N(H) and S. The three- or four-membered ring contains zero or one double bond and a heteroatom selected from the group consisting of O, N, N(H) and S. The five-membered ring contains zero or one double bond, and one, two or three heteroatoms selected from the group consisting of O, N, N(H) and S. The six-membered ring contains zero, one or two double bonds and one, two or three heteroatoms selected from the group consisting of O, N, N(H) and S. The seven-membered ring contains zero, one, two, or three double bonds and one, two or three heteroatoms selected from the group consisting of O, N, N(H) and S. The monocyclic heterocycle can be unsubstituted or substituted and is connected to the parent molecular moiety through any substitutable carbon atom or any substitutable nitrogen atom contained within the monocyclic heterocycle.

Examples of heterocyclyl groups include pyridyl, piperidinyl, piperazinyl, pyrazinyl, pyrolyl, pyranyl, tetrahydropyranyl, tetrahydrothiopyranyl, pyrrolidinyl, pyrrolidinonyl, furanyl, tetrahydrofuranyl, thiophenyl, tetrahydrothiophenyl, purinyl, pyrimidinyl, thiazolyl, thiazolidinyl, thiazolinyl, oxazolyl, triazolyl, tetrazolyl, tetrazinyl, benzoxazolyl, morpholinyl, thiophorpholinyl, quinolinyl, and isoquinolinyl.

The term "heteroaryl" refers to a cyclic aromatic radical having from five to ten ring atoms of which at least one atom is O, S, or N, and the remaining atoms are carbon. Examples of heteroaryl radicals include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, and isoquinolinyl.

Substituents on the heterocyclyl or the heteroaryl moiety can be alkyl, halo, hydroxy, nitro, carboxy, keto, oxo, amino, sulfoxy, sulfonyl, sulfonyloxy, phospho, phosphono, or any combination thereof. For example, a ring $CH_2$ group can be replaced by a C=O group. Substitution can be on a carbon atom or on a hetero atom such as ring nitrogen, for example, an alkyl group on ring nitrogen providing a quaternary ammonium group.

In accordance with an embodiment, the alkyl group is preferably a $C_1$-$C_6$ alkyl. Examples of alkyl groups include methyl, ethyl, n-propyl, isopropyl, n-butyl, sec-butyl, isobutyl, tert-butyl, n-pentyl, isopentyl, n-hexyl, and the like.

A zwitterionic group comprises a positively charged group and a negatively charged group separated by a suitable spacer atom, such as carbon, oxygen, or sulfur, or a moiety such as an alkyl moiety. Examples of positive charged groups include ammonium and quaternary ammonium groups. Examples negatively charged groups include carboxylate, sulfonate, and phosphonate.

In an embodiment, $R^1$ is hydrogen or methyl, and $R^2$ is selected from pyrrolidinonyl, pyridinyl, imidazolyl, N-methylimidazolyl, formylamino, formylaminomethyl, aminocarbonyl, methylcarbonyloxy, and aminocarbonylpropyl substituted with a zwitterionic group.

In a particular embodiment, A is a hydrophilic segment comprising a polymerized monomer or mixture of monomers selected from 1-vinylpyrrolid-2-one, N-[3-(dimethylamino)propyl]methacrylamide, vinyl acetate, 1-vinylimidazole, 1-vinyl-3-alkylimidazolinium, 1-vinyl-2-pyridine, 1-vinyl-4-pyridine, acrylamide, N-vinylformamide, and N-allylformamide, and 3-(methacrylamidopropyl)dimethyl (3-sulfopropyl)ammonium inner salt.

The aromatic hydrophobic polymer can be selected from polysulfone (PSU), polyphenylene ether sulfone (PPES), polyethersulfone (PES), polycarbonate (PC), polyether ether ketone (PEEK), poly(phthalazinone ether sulfone ketone) (PPESK), polyphenyl sulfide (PPS), polyphenylene ether (PPE), polyphenylene oxide (PPO) and polyetherimide (PEI), which have the following structures:

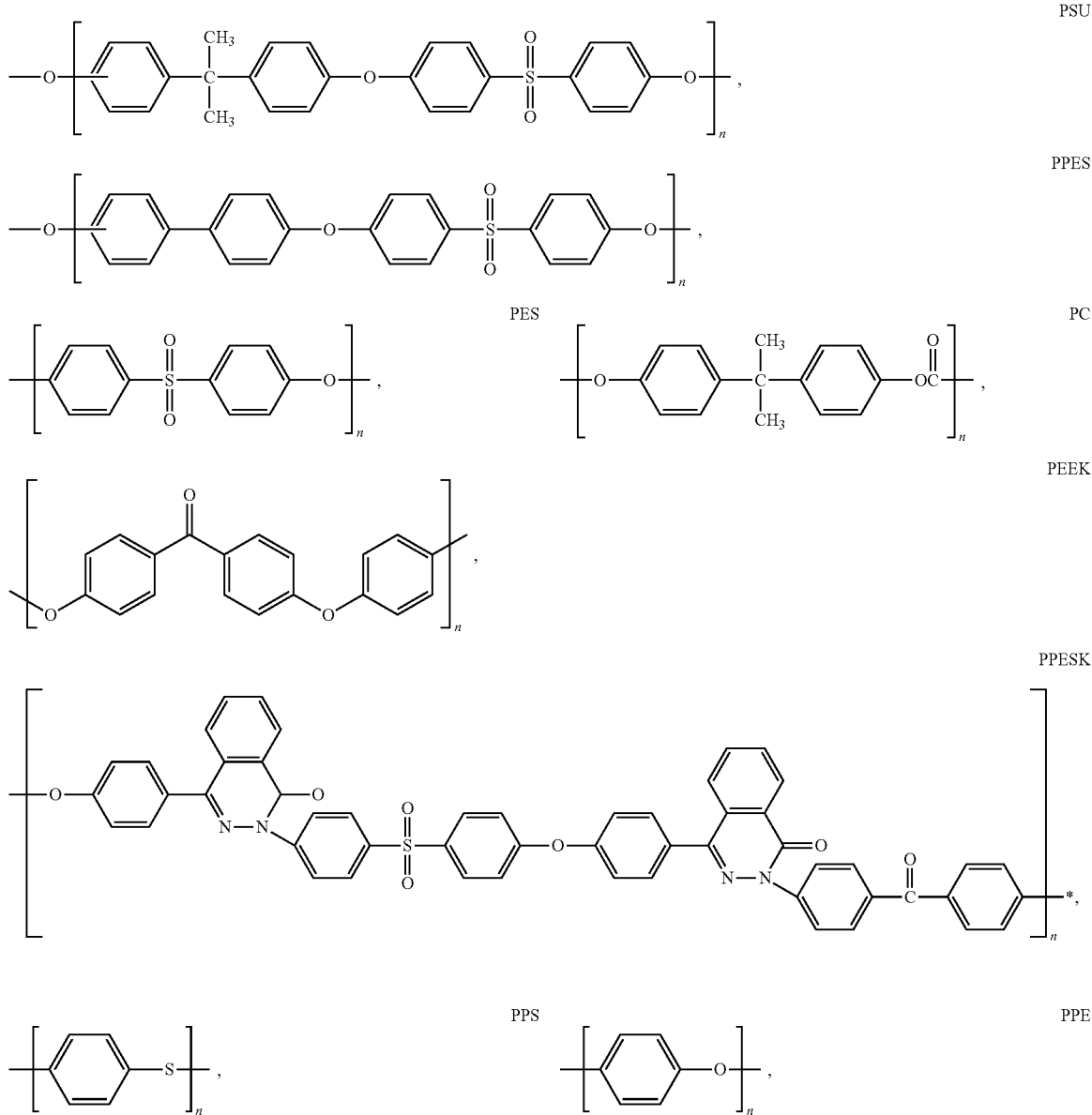

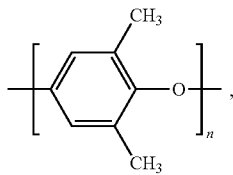
PPO

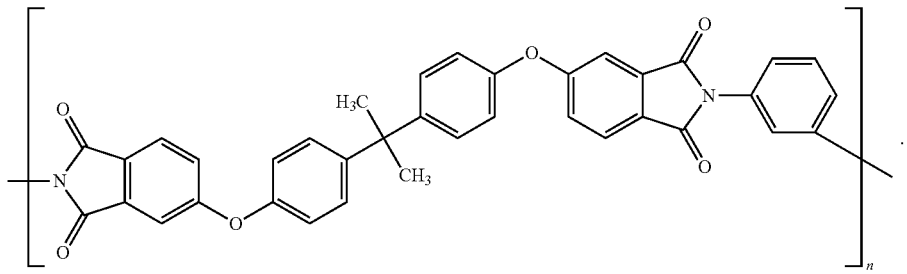
PEI

The aromatic hydrophobic polymer can have any suitable molecular weight, for example, a number average molecular weight of from about 25 kDa to about 250 kDa, preferably from about 50 kDa to about 100 kDa. The value of "n" in the aromatic hydrophobic polymer can be from about 30 to about 300, preferably from about 50 to about 250.

The aromatic hydrophobic polymeric segment B can be selected from polysulfone (PSU), polyphenylene ether sulfone (PPES), polyether sulfone (PES), polyether ether ketone (PEEK), polyphenyl sulfide (PPS), polyphenyl ether (PPE), polyphenylene oxide (PPO) or polyetherimide (PEI), each terminated with one or preferably two amino-substituted moieties. Such amino-substituted moiety, as is known to those skilled in the art, can be introduced by terminating the polycondensation by adding an amino-substituted end cap, for example 4-aminophenol.

The number of repeat units, n, within each of the above aromatic hydrophobic segment B can be from about 10 to about 250, preferably from about 20 to about 200, and more preferably from about 30 to about 100.

The number average molecular weight range of the block copolymer is in the range of from about 5,000 to about 50,000 grams/mole, preferably about 10,000 to about 30,000 grams/mole.

The linking group between B and A is an amidoalkylthio group, as illustrated herein within square brackets: —(B)—[NH—C(=O)—(CH$_2$)$_a$—S]-(A), wherein a is 1-6, preferably 1-3, and more preferably 1.

In accordance with an embodiment, the copolymer is of the formula (Ia) or (Ib):

$$T\text{-}(A')_{m1}\text{-}X\text{—}[B]\text{—}X\text{-}(A')_{m2}\text{-}T \quad (Ia),$$

$$Y\text{—}[B]\text{—}X\text{-}(A')_{m1}\text{-}T \quad (Ib),$$

wherein B is as defined above, A' is a polymeric segment of the hydrophilic monomer, X is —NHC(=O)(CH$_2$)$_p$S—, wherein p is 1-3, T is an end group, and Y is a group other than amino group. For example, Y is an alkyl, alkoxy, chloro, or hydroxy group.

In accordance with an embodiment of the invention, the copolymer is of the formula:

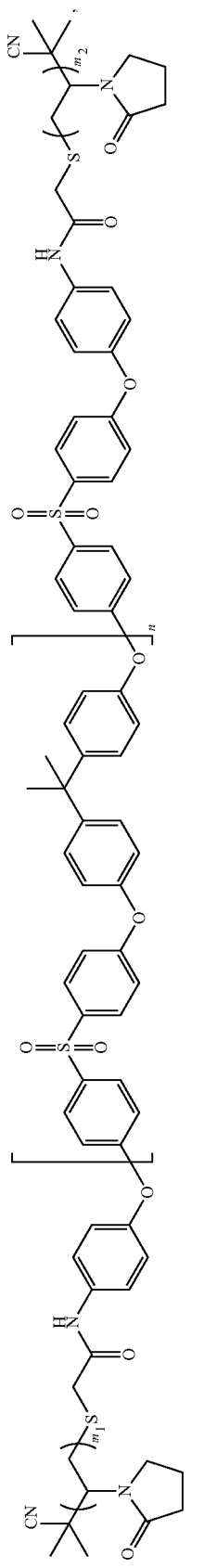
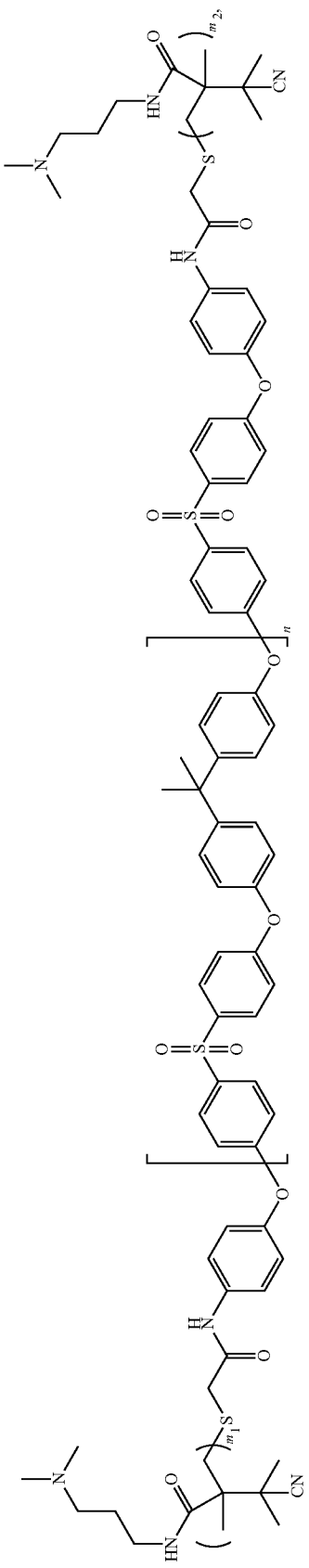
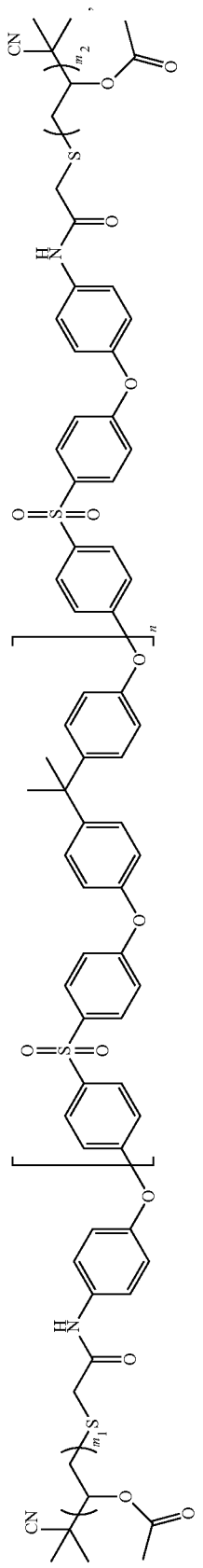

-continued
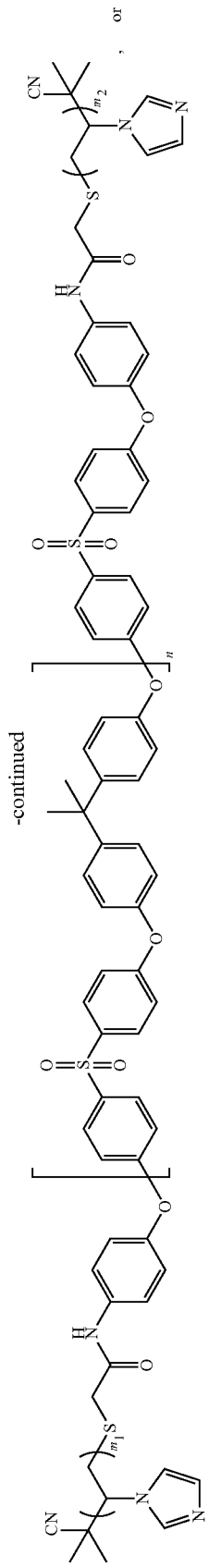
, or
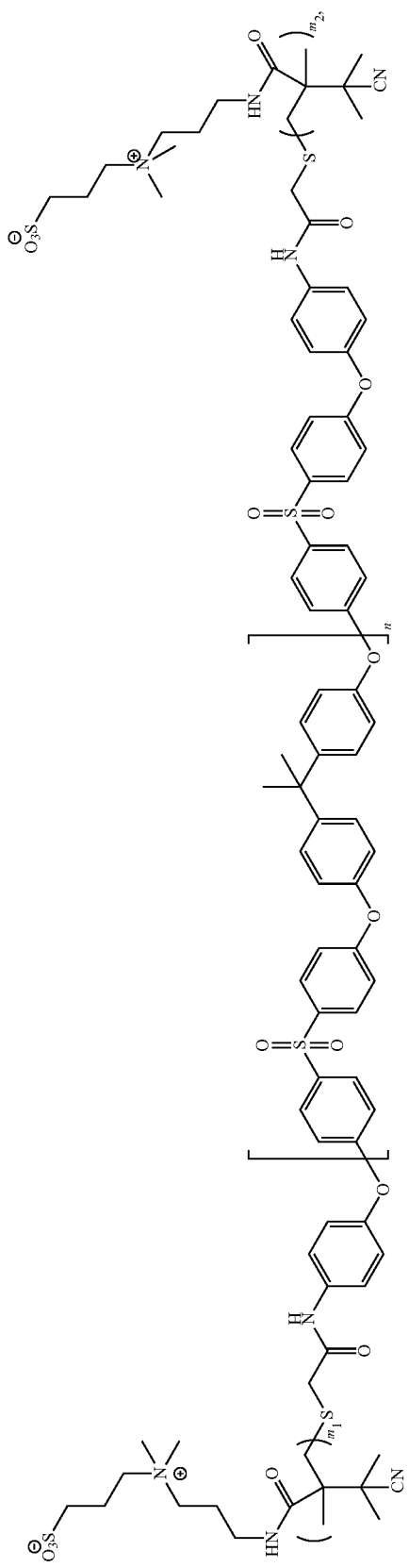

wherein $m_1$ or $m_2$ is from about 5 to about 50 and preferably from about 10 to about 30 and n is from about 20 to about 200, and preferably from about 30 to about 100.

The copolymers can be prepared by radical polymerization of a vinyl monomer in conjunction with chain transfer on a preformed polymeric segment B having thiol as terminal group. Such group can be introduced on the polymer by the amide formation between the mercaptoalkyl carboxylic acid and the amino-terminus of the segment. Such amine moiety can be introduced by terminating the polycondensation with an amino-substituted end cap, for example 4-aminophenol, as is known to those skilled in the art. Diblock copolymers of the type A-B can be prepared from a polymeric segment B having one terminal group and triblock copolymers of the A-B-A can be prepared from a polymeric segment B having two terminal groups.

An example of a starting material for polymeric segment B that is commercially available is Solvay's bis-telechelic polysulfone VW-30500 RP which has amine (aniline) end groups. The amine end groups are reacted with mercapto sodium acetate in presence of a condensing reagent, for example, propyl phosphonic anhydride, T3P. The resulting polymeric segment B having thiol end groups is utilized to anchor the polyvinylpyrrolidone formed during the radical polymerization as illustrated below:

The present invention further provides a method of preparing a self-wetting porous membrane comprising: (i) casting a solution comprising a solvent, an aromatic hydrophobic polymer, and a copolymer of formula A-B-A, wherein A is a hydrophilic segment comprising a polymerized monomer or mixture of monomers, wherein the monomer is of the formula (I):

$$CH_2=C(R^1)(R^2) \qquad (I),$$

wherein $R^1$ is hydrogen or alkyl, and $R^2$ is selected from substituted or unsubstituted heterocyclyl, substituted or unsubstituted heteroaryl, formylamino, formylaminoalkyl, aminocarbonyl, alkylcarbonyloxy, and aminocarbonylalkyl substituted with a zwitterionic group, and B is an aromatic hydrophobic polymeric segment, wherein segments B and A are linked through an amidoalkylthio group, to a desired shape; (ii) subjecting the cast solution to phase inversion to form the self-wetting porous membrane; and (iii) optionally rinsing the self-wetting porous membrane with water.

The present invention further provides a self-wetting porous membrane prepared by the method described above.

In accordance with an embodiment of the invention, the self-wetting porous membrane is a porous membrane, e.g., a nanoporous membrane, for example, a membrane having

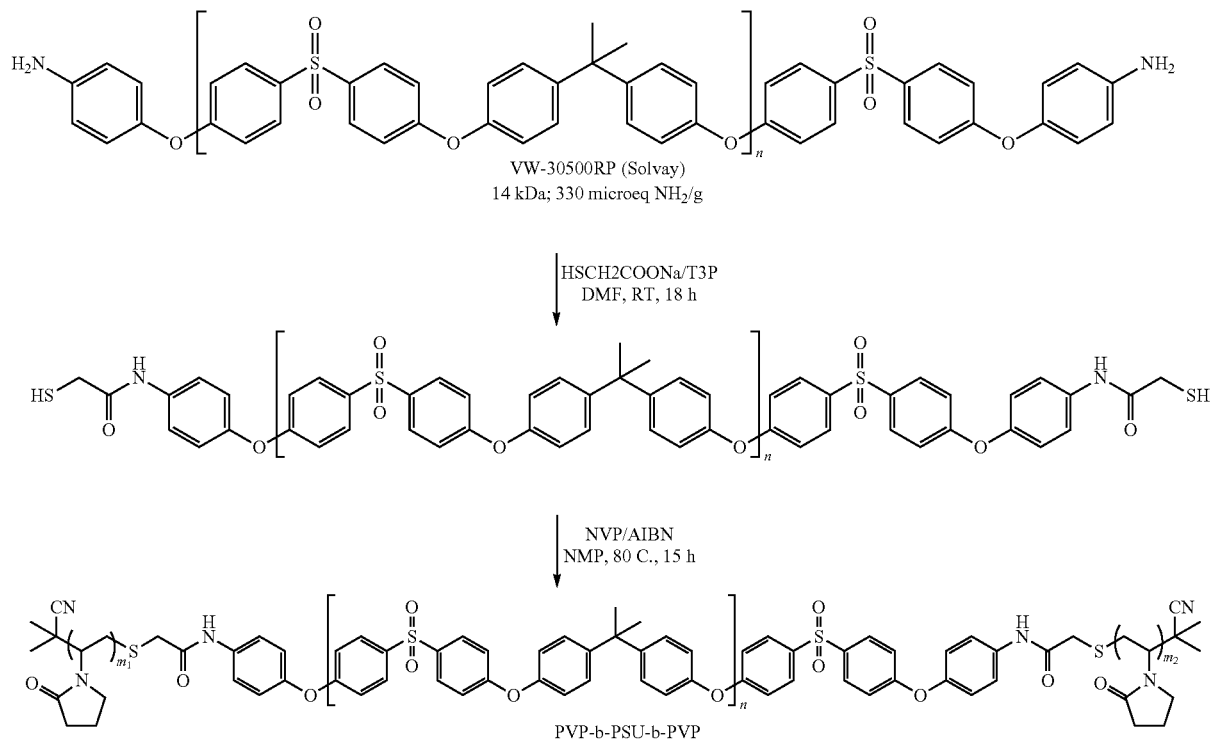

pores of diameter between 1 nm and 100 nm, or a microporous membrane having pores of diameter between 1 μm and 10 μm.

Any suitable free radical initiator can be employed, for example, azoisobutyronitrile (AIBN), benzoyl peroxide, acetyl peroxide, lauryl peroxide, t-butyl peroxide, cumyl peroxide, t-butylperacetate, and t-butyl hydroperoxide. Accordingly, the nature of the copolymers' end group can vary depending on the initiator employed. The 2-methylpropionitrile end group present in the copolymers of embodiments of the present invention is derived from the termination of the copolymerization with the radical generated from AIBN. Examples of other end groups can be benzoate, acetate, laurate, t-butyloxy, cumyloxy, and the like.

A membrane-forming polymer solution is prepared by dissolving the polymer in a solvent or a mixture of solvents. A variety of polymers is suitable for use as membrane-forming polymers in the invention, and is known in the art. Suitable polymers can include, polymers such as, for example, polysulfone (PSU), polyethersulfone (PES), polyphenyl ether (PPE), polyphenylene ether sulfone (PPES), polyphenylene oxide (PPO), polycarbonate (PC), poly(phthalazinone ether sulfone ketone) (PPESK), polyether ether ketone (PEEK), polyether ketone ketone (PEKK), polyetherimide (PEI) and blends thereof.

In addition to one or more polymers, polymer solutions comprise at least one solvent, and may further comprise at least one non-solvent. Suitable solvents include, for example, N,N-dimethylformamide (DMF); N,N-dimethylacetamide (DMAC); N-methyl pyrrolidone (NMP); dimethyl sulfoxide (DMSO), methyl sulfoxide, and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols.

Typically, the copolymer A-B-A of the present invention is included in an amount of from about 3 to about 20 wt. %, preferably in the range of about 4 to about 15 wt. % in the membrane casting solution.

In addition to the copolymer, the membrane casting solution typically includes about 10 to about 30 wt. % of the aromatic hydrophobic polymer, about 0 to about 10 wt % an additive such as PEG, a polar solvent or mixture of solvents such as NMP, DMF, and/or DMAc in an amount up to about 90 wt %. A nonsolvent such as water and/or alcohol can also be included.

Typical quenching baths that may be utilized in the formation of the self-wetting membranes include, but are not limited to, baths which contain non-solvents such as water, alcohols and the like, either by themselves, or in combination with one or more polar solvents.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

The aromatic hydrophobic polymer, the copolymer, and the solvent and other additives are first mixed together and then heated at a temperature of about 35 to about 75° C., preferably about 40 to about 50° C., until a homogeneous solution is obtained.

Flat sheet membranes can be prepared on a suitable substrate such as glass by casting a film having a suitable thickness, e.g., about 0.005 to about 0.006 inch using a doctoring knife. The cast film is coagulated in a quenching bath and washed in water for a period of time which is sufficient to leach out any material that is not directly bound to the hydrophobic-base polymer. The membrane is dried by methods known to those skilled in the art.

In addition to preparing flat sheet membranes, the self-wetting membranes of the present invention can be formed into pleated membranes, hollow fiber membranes, tubular membranes and the like using processes that are well known in the art.

The present invention further provides a method of filtering a fluid, the method comprising passing the fluid through the self-wetting porous membrane.

Self-wetting porous membranes according to embodiments of the invention can be used in a variety of applications, including, for example, hemodialysis, microfiltration, and ultrafiltration applications. Additionally they may also find use in diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, porous membranes according to embodiments of the invention can be used to filter air and/or gas and/or can be used for venting applications (e.g., allowing air and/or gas, but not liquid, to pass therethrough). Porous membranes according to embodiments of the inventions can be used in a variety of devices, including surgical devices and products, such as, for example, ophthalmic surgical products.

In accordance with embodiments of the invention, the self-wetting porous membrane can have a variety of configurations, including planar, flat sheet, pleated, tubular, spiral, and hollow fiber.

Self-wetting porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

Materials and Methods:

The starting material was Solvay's bis-telechelic polysulfone VW-30500 RP (also known as PXM-10147) described to have the terminal aniline moiety with density of 0.33 millieq of $NH_2$ per gram of resin, as determined by titration. The average molecular weight is 14 kDa, as determined by the GPC analysis in DMAc. All the cited data has been provided by the manufacturer.

In-house analysis performed in DMF with 0.05N LiBr and PMMA as a standard gave the value of Mw=17500 with a polydispersity index (PDI) of 1.49.

$^1$H NMR analysis confirmed the presence of the aniline end-groups manifested as the broad peak between 5.10-5.15 ppm (in DMSO-$d_6$). The vinyl monomer was either vacuum distilled or passed through column with inhibitor remover.

EXAMPLE 1

This example illustrates a method of preparing a macro-CTA (Chain Transfer Agent) in accordance with an embodiment of the invention.

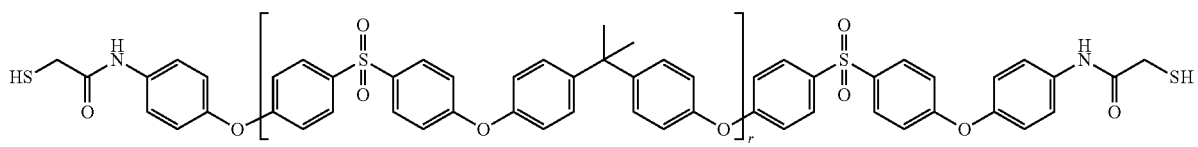

The starting diamino-macromer (24.0 g; 8 mmol of NH$_2$) and sodium mercaptoacetate (2.74 g; 24 mmol) were dissolved in anhydrous DMF (160 mL) followed by dropwise addition of 50% DMF solution of T3P (15.3 g; 24 mmol) with vigorous stirring at ambient temperature. After 24 h the reaction mixture was quenched by pouring into 1.4 L of vigorously stirred water. The precipitate formed was filtered-off, washed with water (2 times 500 mL), acetone (500 mL), and diethyl ether (200 mL). The obtained solid was further purified by re-precipitation by dissolving in chloroform (300 mL) and adding dropwise into stirred methanol (1.5 L). The precipitate was collected by filtration, washed with copious amount of methanol and dried in vacuum oven at 60° C. overnight, yielding 22.3 g of product.

$^1$H NMR analysis (in DMSO-d$_6$) indicated the complete disappearance of the aniline end-groups at 5.10-5.15 ppm. GPC: Mw 20119; PDI=1.59.

The macro-CTA (0.5 g; 0.165 mmol of SH), 1-vinylpyrrolid-2-one (1.1 mL; 9.9 mmol) and AIBN (3 mg; 0.018 mmol) were dissolved in anhydrous NMP (2 mL) and copolymerized according to the above protocol, yielding 0.49 g of the desired product.

$^1$H NMR analysis (in CDCl$_3$) indicated 20 molar % of VP unit, as determined by comparing integration of signals between 7.75-8.00 ppm (4H of PSU unit) and 3.00-4.00 ppm (3H of VP unit). Elemental analysis (% N=0.80; % S=7.12) gave 21 molar % of VP. GPC: Mw=19833; PDI=1.85.

EXAMPLE 4

This example illustrates a method of preparing PVP-b-PSU-b-PVP, with $(m_1+m_2)/n=0.47$, in accordance with an embodiment of the invention.

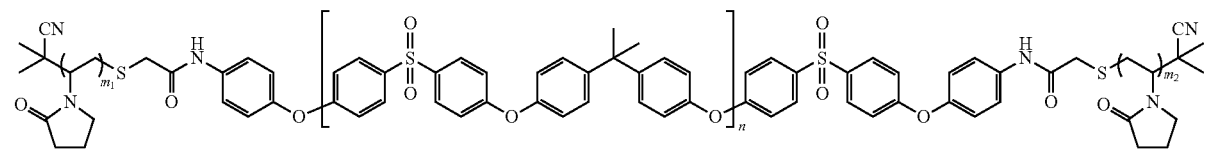

EXAMPLE 2

This example illustrates a general protocol of preparing copolymer A-B-A in accordance with an embodiment of the invention.

Macro-CTA was dissolved in anhydrous NMP, followed by addition of the vinyl monomer and AIBN as radical initiator. The resulting mixture was purged with argon at ambient temperature for at least 2-5 min, followed by the heating at 80° C. for 16-24 h. After that time the reaction mixture was open to air and added to excess of vigorously stirred non-solvent, usually at least 10 volumes of 2-propanol. The resulting precipitate was filtered-off (or centrifuged in some cases), rinsed well with 2-propanol and dried in vacuum oven at 70° C. overnight. The obtained material was analyzed by GPC (DMF with 0.05N LiBr, calibrated with PMMA molecular weight standards) and the composition was determined by the $^1$H NMR analysis and the elemental analysis.

EXAMPLE 3

This example illustrates a method of preparing PVP-b-PSU-b-PVP, with $(m_1+m_2)/n=0.20$, in accordance with an embodiment of the invention.

The macro-CTA (0.5 g; 0.165 mmol of SH), 1-vinylpyrrolid-2-one (0.71 mL; 6.6 mmol) and AIBN (14 mg; 0.085 mmol) were dissolved in anhydrous NMP (2 mL) and copolymerized according to the general protocol, yielding 0.44 g of product.

$^1$H NMR analysis (in CDCl$_3$) indicated 47 molar % of VP unit, as determined by comparing integration of signals between 7.75-8.00 ppm (4H of PSU unit) and 3.00-4.00 ppm (3H of VP unit). Elemental analysis indicated 46 molar % of VP unit. GPC: Mw=23260; PDI=1.62.

EXAMPLE 5

This example illustrates a method of preparing PVP-b-PSU-b-PVP, with $(m_1+m_2)/n=0.67$, in accordance with an embodiment of the invention.

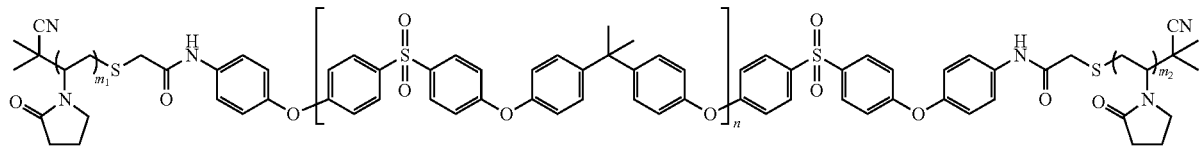

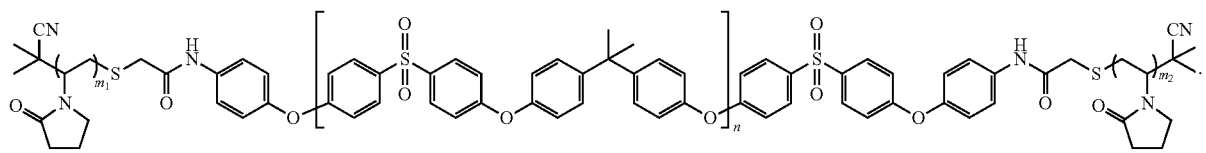

The macro-CTA (10.0 g; 3.33 mmol of SH), 1-vinylpyrrolid-2-one (21.2 mL; 198 mmol) and AIBN (0.56 g; 3.4 mmol) were dissolved in anhydrous NMP (40 mL) and copolymerized according to the general protocol, yielding 12.25 g of product.

$^1$H NMR analysis (in CDCl$_3$) indicated 67 molar % of VP unit, as determined by comparing integration of signals between 7.75-8.00 ppm (4H of PSU unit) and 3.00-4.00 ppm (3H of VP unit). Elemental analysis (% N=3.78; % S=5.28) indicated 62 molar % of VP unit. GPC: Mw=29122; PDI=1.73.

EXAMPLE 6

This example illustrates a method of preparing PDMAPMA-b-PSU-b-PDMAPMA, with $(m_1+m_2)/n=0.34$, in accordance with an embodiment of the invention.

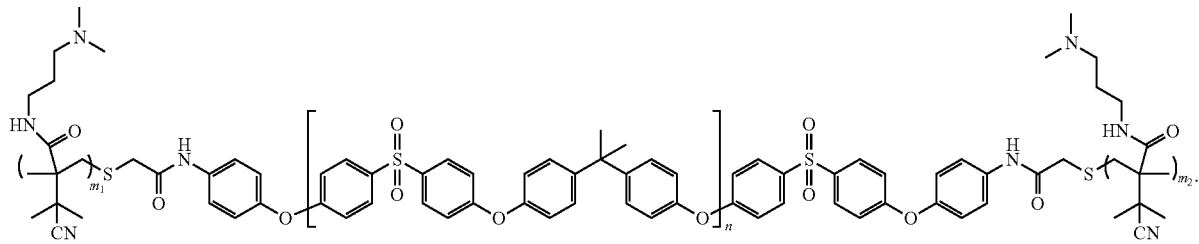

The macro-CTA (3.0 g; 1 mmol of SH), N-[3-(Dimethylamino)propyl]methacrylamide (11.0 mL; 60 mmol) and AIBN (0.164 g; 1 mmol) were dissolved in anhydrous NMP (10 mL) and copolymerized according to the general protocol, yielding 3.05 g of product. The resulting product was purified by re-precipitation by dissolving in chloroform and adding to 10 volumes of diethyl ether. Final yield was 2.68 g.

$^1$H NMR analysis (in DMSO-d$_6$) indicated 34 molar % of DMAPMA unit, as determined by comparing the integration of signals between 7.75-8.00 ppm (4H of PSU unit) and 2.80-3.10 ppm (2H of DMAPMA unit). Elemental analysis (% N=2.76; % S=6.18) indicated 33 molar % of DMAPMA. GPC: Mw=23024; PDI=1.64.

EXAMPLE 7

This example illustrates a method of preparing PVAc-b-PSU-b-PVAc, with $(m_1+m_2)/n=0.34$, in accordance with an embodiment of the invention.

The macro-CTA (0.50 g; 0.165 mmol of SH), vinyl acetate (0.92 mL; 9.9 mmol) and AIBN (14 mg; 0.0825 mmol) were dissolved in anhydrous NMP (2 mL) and copolymerized according to the general protocol, except that methanol was used as a non-solvent used to precipitate and wash the product. Yield of copolymer was 0.45 g.

$^1$H NMR analysis (in DMSO-d$_6$) indicated 41 molar % of VAc unit, as determined by comparing the integration of signals between 7.75-8.00 ppm (4H of PSU unit) and 1.85-2.05 ppm (3H of the VAc unit). GPC: Mw=23042; PDI=1.76.

EXAMPLE 8

This example illustrates a method of preparing PVIm-b-PSU-b-PVIm, with $(m_1+m_2)/n=0.57$, in accordance with an embodiment of the invention.

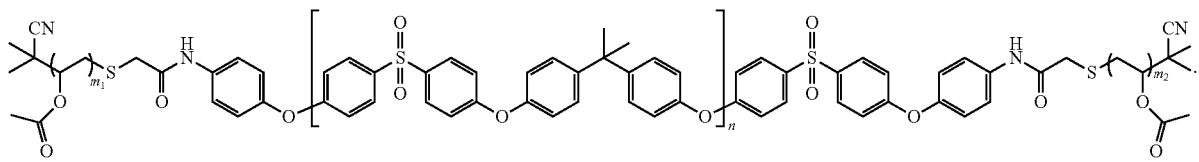

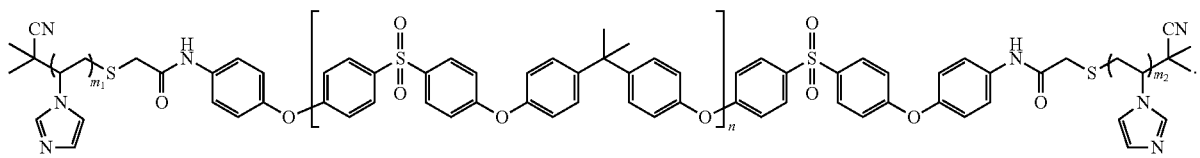

The macro-CTA (0.50 g; 0.165 mmol of SH), 1-vinylimidazole (0.90 mL; 9.8 mmol) and AIBN (14 mg; 0.0825 mmol) were dissolved in anhydrous NMP (2 mL) and copolymerized according to the general protocol, except that methanol was used as a non-solvent used to precipitate and wash the product. Yield of copolymer was 0.35 g.

$^1$H NMR analysis (in DMSO-$d_6$) indicated 57 molar % of VIm unit, as determined by comparing the integration of signals between 6.60-8.00 ppm (16H of PSU unit and H of Vim unit) and 1.50-1.70 ppm (6H of PSU unit). Elemental analysis (% N=7.03; % S=6.31) indicated 56 molar % of VIm. GPC: Mw=25851; PDI=1.70.

EXAMPLE 9

This example illustrates a method of preparing PSZM-b-PSU-b-PSZM (poly-sulfobetaine-zwitterionic-methacrylamide copolymer), with $(m_1+m_2)/n=0.27$, in accordance with an embodiment of the invention.

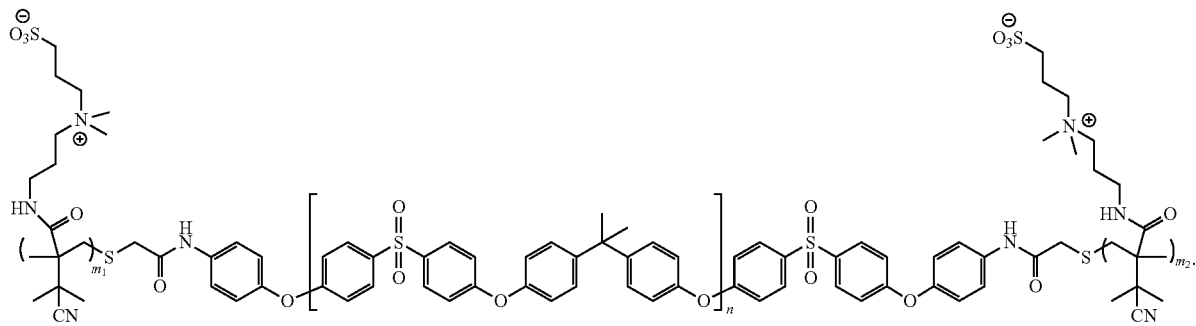

The macro-CTA (0.50 g; 0.165 mmol of SH), 3-(methacrylamidopropyl)dimethyl(3-sulfopropyl)ammonium inner salt (3.0 g; 9.9 mmol) and AIBN (28 mg; 0.165 mmol) were suspended in anhydrous NMP (5 mL) and copolymerized according to the general protocol. Crude, dried precipitate from 2-propanol (2.1 g) was extracted with 25 mL of DMAc for 1 h at ambient temperature. The decanted extract was added to 10 volumes of 2-propanol, followed by 8 volumes of hexane. The resulting precipitate was collected and dried to give 0.34 g of product.

$^1$H NMR analysis (in DMSO-$d_6$) indicated 27 molar % of the SZM unit, as determined by comparing the integration of signals between 7.75-8.00 ppm (4H of PSU unit) and 1.10-1.35 ppm (3H of SZM unit). Elemental analysis (% N=2.05; % S=7.70) indicated 30 molar % of the SZM unit. GPC: Mw=20419; PDI=1.81.

EXAMPLE 10

This example illustrates a method of preparing self-wetting membrane in accordance with an embodiment of the invention.

A membrane casting solution containing polyethersulfone (13 wt %), copolymer PVP-b-PSU-b-PVP of Example 5 (0.9 wt %), glycerol (1 wt %), water (3 wt %), N-methylpyrrolidone (7.6 wt %), N,N-dimethylformamide (10 wt %), and polyethylene glycol 400 (64.5 wt %) was prepared by stirring the ingredients at 46° C. overnight and storing it for 24 h at room temperature.

The membrane casting solution was cast on a glass plate maintained at 29° C. and placed in an environmental chamber at 28° C./70% RH for 10 minutes, followed by immersion in water until complete solidification occurred. This membrane was named VIPS.

Another membrane was cast as follows. The casting solution was cast on a glass plate at 29° C. and immersed immediately in water at 80° C. and the resulting membrane was named HTQ.

The membranes were leached in 64% SDA for 60 min, followed by water at 80° C. for 60 min, and dried at 65° C. for 40 min.

The CWST of the VIPS membrane was 83 dynes/cm$^2$ (instant) and 87 dynes/cm$^2$ (5 sec). The CWST of the HTQ membrane was 83 dynes/cm$^2$ (5 sec). The non-specific protein (BSA) binding was in the range of 23-27 µg/cm$^2$.

The FIGURE depicts the SEM micrograph of the VIPS membrane. The membrane has highly open porous structure. Nodular morphology is also evident.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A self-wetting porous membrane comprising an aromatic hydrophobic polymer and a wetting agent comprising a copolymer of formula A-B or A-B-A,
   wherein A is a hydrophilic segment comprising a polymerized monomer or mixture of monomers, wherein the monomer is of the formula (I):

$$CH_2\!=\!C(R^1)(R^2) \tag{I},$$

wherein $R^1$ is hydrogen or alkyl, and $R^2$ is selected from substituted or unsubstituted heterocyclyl, substituted or unsubstituted heteroaryl, formylamino, formylaminoalkyl, aminocarbonyl, alkylcarbonyloxy, and aminocarbonylalkyl substituted with a zwitterionic group,
   and B is an aromatic hydrophobic polymeric segment, wherein segments B and A are linked through an amidoalkylthio group.

2. The self-wetting porous membrane of claim 1, wherein $R^1$ is hydrogen or methyl, and $R^2$ is selected from pyrrolidinonyl, pyridinyl, imidazolyl, N-methylimidazolyl, formylamino, formylaminomethyl, aminocarbonyl, methylcarbonyloxy, and aminocarbonylpropyl substituted with a zwitterionic group.

3. The self-wetting porous membrane of claim 1, wherein the monomer of A is selected from 1-vinylpyrrolid-2-one, N-[3-(dimethylamino)propyl]methacrylamide, vinyl acetate, 1-vinylimidazole, 1-vinyl-3-methylimidazole, 1-vinyl-2-pyridine, 1-vinyl-4-pyridine, acrylamide, N-vinylformamide, and N-allylformamide, and 3-(methacrylamidopropyl)dimethyl(3-sulfopropyl)ammonium inner salt.

4. The self-wetting porous membrane of claim 1, wherein the aromatic hydrophobic polymeric segment B is selected from polysulfone, polyethersulfone, polyphenyl ether, polyphenylene ether sulfone, polyphenylene oxide, polyether ether ketone, polyether ketone ketone, and polyetherimide.

5. The self-wetting porous membrane of claim 1, wherein the aromatic hydrophobic polymeric segment B is polysulfone.

6. The self-wetting porous membrane of claim 1, wherein the aromatic hydrophobic polymer is selected from polysulfone, polyethersulfone, polyphenyl ether, polyphenylene ether sulfone, polyphenylene oxide, polycarbonate, poly(phthalazinone ether sulfone ketone), polyether ketone, polyether ether ketone, polyether ketone ketone, polyimide, polyetherimide, and polyamide-imide.

7. The self-wetting porous membrane of claim 1, wherein the aromatic hydrophobic polymer is polysulfone or polyethersulfone.

8. The self-wetting porous membrane of claim 1, the copolymer is of the formula (Ia) or (Ib):

$$T\text{-}(A')_{m1}\text{-}X\text{—}[B]\text{—}X\text{-}(A')_{m2}\text{-}T \tag{Ia}$$

$$Y\text{—}[B]\text{—}X\text{-}(A')_{m1}\text{-}T \tag{Ib},$$

wherein B is the aromatic hydrophobic polymeric segment, A' is a polymeric segment of the hydrophilic monomer, X is —NHC(=O)(CH$_2$)$_p$S—, wherein p is 1-3, T is an end group selected from the group consisting of 2-methylpropionitrile, benzoate, acetate, laurate, t-butyloxy and cumyloxy, $m_1$ and $m_2$ are each from about 5 to 50, and Y is a group other than amino group.

9. The self-wetting porous membrane of claim 1, wherein the copolymer is of the formula:

23
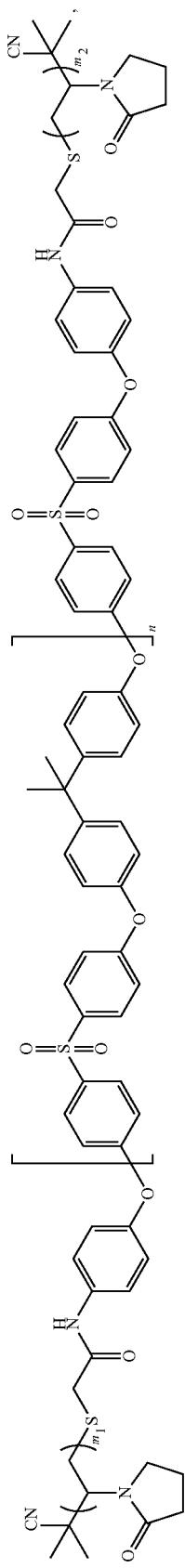
24
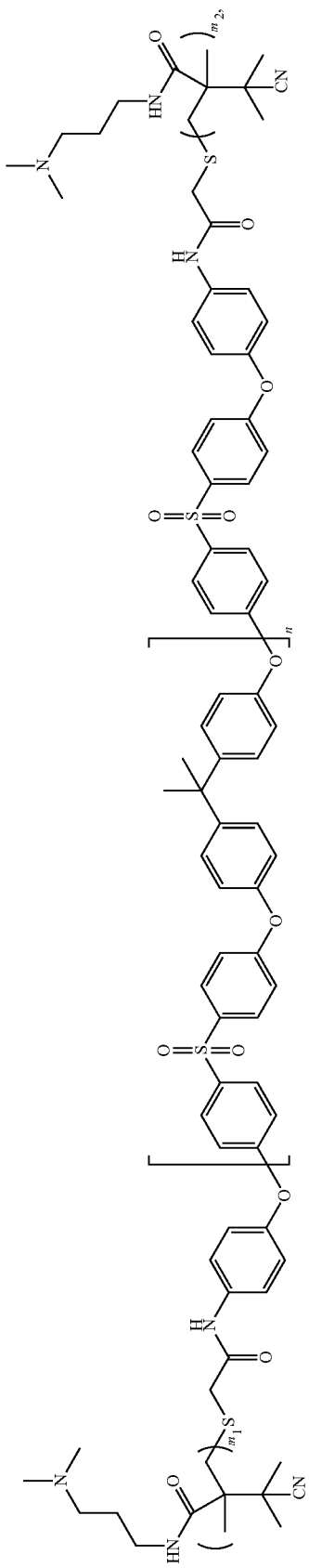
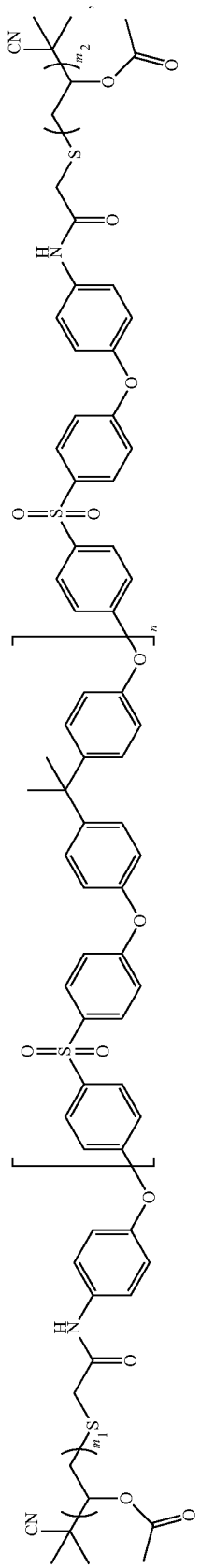

-continued
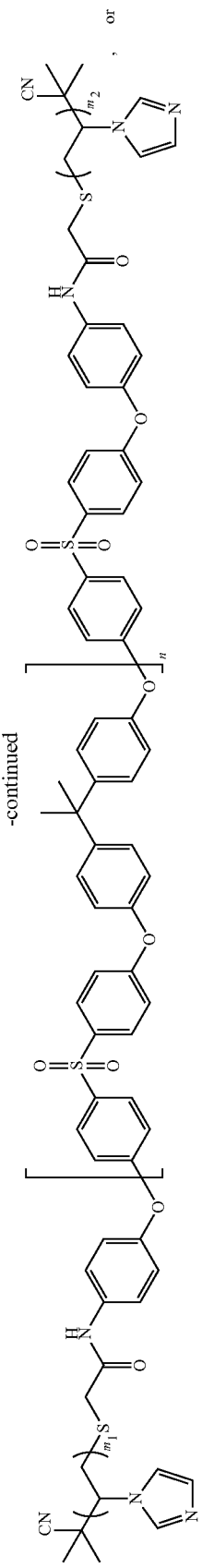
, or
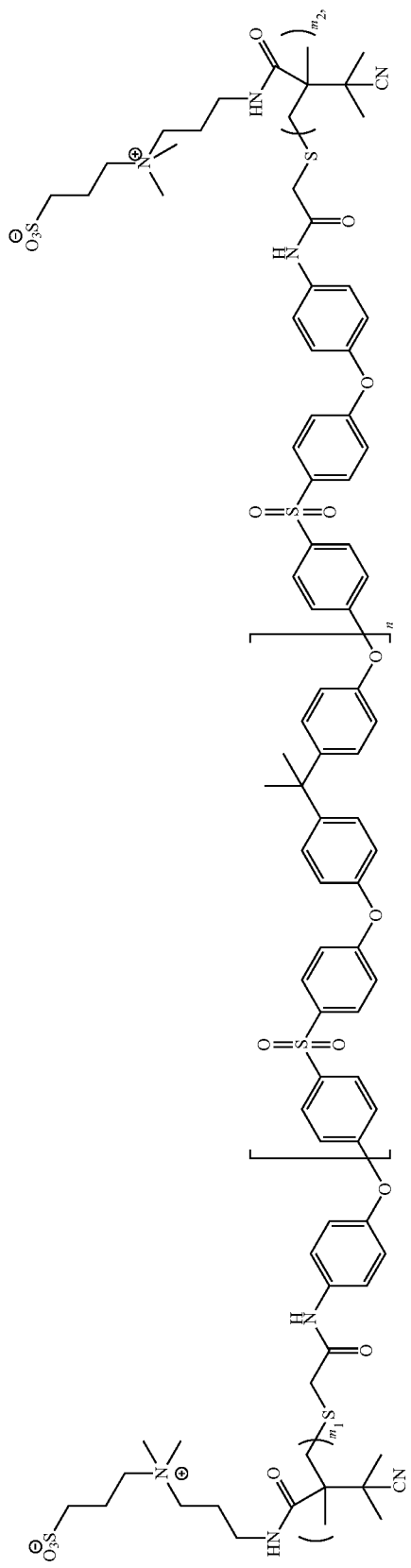

wherein each of $m_1$ and $m_2$ is from about 5 to about 50 and n is from about 20 to about 200.

10. A method of preparing a self-wetting porous membrane comprising:
(i) casting a solution comprising a solvent, an aromatic hydrophobic polymer, and a copolymer of formula A-B or A-B-A, wherein A is a hydrophilic segment comprising a polymerized monomer or mixture of monomers, wherein the monomer is of the formula (I):

$$CH_2=C(R^1)(R^2) \qquad (I),$$

wherein $R^1$ is hydrogen or alkyl, and $R^2$ is selected from substituted or unsubstituted heterocyclyl, substituted or unsubstituted heteroaryl, formylamino, formylaminoalkyl, aminocarbonyl, alkylcarbonyloxy, and aminocarbonylalkyl substituted with a zwitterionic group,
and B is an aromatic hydrophobic polymeric segment, wherein segments B and A are linked through an amidoalkylthio group, to a desired shape;
(ii) subjecting the cast solution to phase inversion to form the self-wetting porous membrane; and
(iii) optionally rinsing the self-wetting porous membrane with water.

11. The method of claim 10, wherein $R^1$ is hydrogen or methyl, and $R^2$ is selected from pyrrolidinonyl, pyridinyl, imidazolyl, N-methylimidazolyl, formylamino, formylaminomethyl, aminocarbonyl, methylcarbonyloxy, and aminocarbonylpropyl substituted with a zwitterionic group.

12. The method of claim 10, wherein the monomer of A is selected from 1-vinylpyrrolid-2-one, N-[3-(dimethylamino)propyl]methacrylamide, vinyl acetate, 1-vinylimidazole, 1-vinyl-3-methylimidazole, 1-vinyl-2-pyridine, 1-vinyl-4-pyridine, acrylamide, N-vinylformamide, and N-allylformamide, and 3-(methacrylamidopropyl)dimethyl (3-sulfopropyl)ammonium inner salt.

13. The method of claim 10, wherein the aromatic hydrophobic polymeric segment B of the copolymer is selected from polysulfone, polyethersulfone, polyphenyl ether, polyphenylene ether sulfone, polyphenylene oxide, polyether ether ketone, polyphenyl sulfide, and polyetherimide.

14. The method of claim 10, wherein the aromatic hydrophobic polymeric segment B of the copolymer is polysulfone.

15. The method of claim 10, wherein the aromatic hydrophobic polymer is selected from polysulfone, polyethersulfone, polyphenylene ether, polyphenylene ether sulfone, polyphenylene oxide, polycarbonate, poly(phthalazinone ether sulfone ketone), polyether ketone, polyether ether ketone, polyether ketone ketone, polyimide, polyetherimide, and polyamide-imide.

16. The method of claim 10, wherein the aromatic hydrophobic polymer is polysulfone or polyethersulfone.

17. The method of claim 10, wherein the copolymer is of the formula (Ia) or (Ib):

$$T\text{-}(A')_{m_1}\text{-}X\text{—}[B]\text{—}X\text{-}(A')_{m_2}\text{-}T \qquad (Ia),$$

$$Y\text{—}[B]\text{—}X\text{-}(A')_{m_1}\text{-}T \qquad (Ib),$$

wherein B is the aromatic hydrophobic polymeric segment, A' is a polymeric segment of the hydrophilic monomer, X is $-NHC(=O)(CH_2)_pS-$, wherein p is 1-3, T is an end group selected from the group consisiting of 2-methylpropionitrile, benzoate, acetate, laurate, t-butyloxy and cumyloxy, $m_1$ and $m_2$ are each from about 5 to 50, and Y is a group other than amino group.

18. The method of claim 10, wherein the copolymer is of the formula:

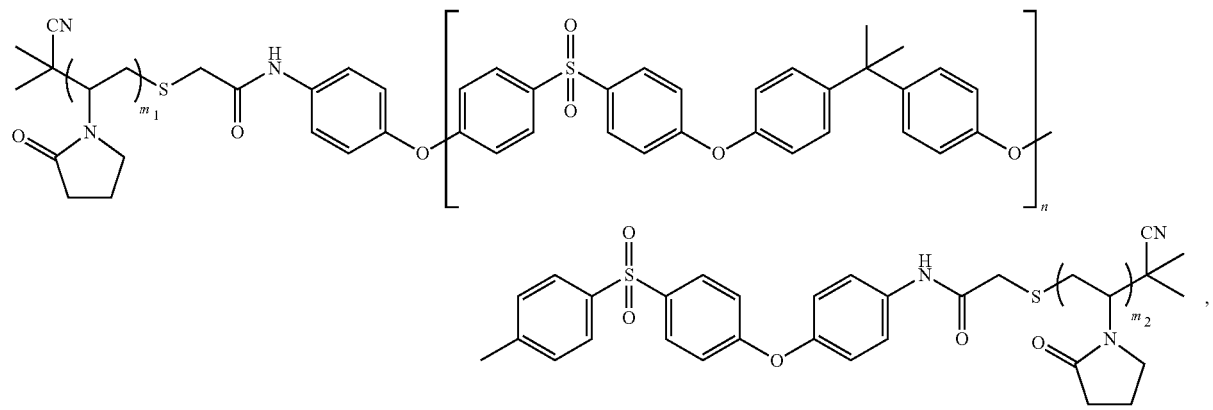

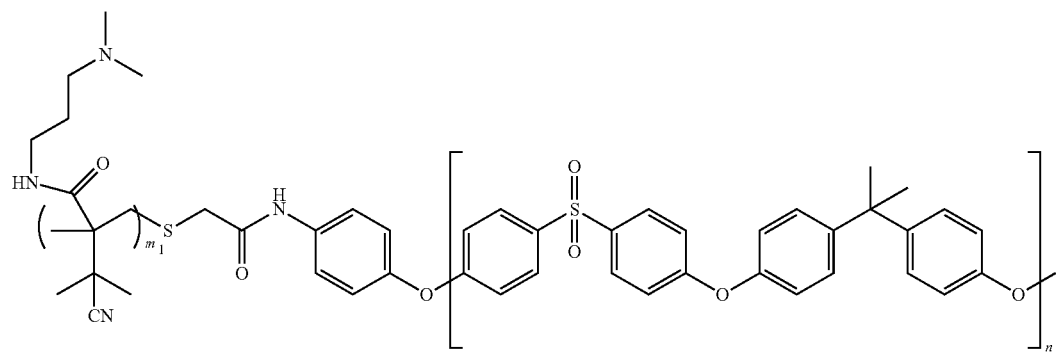

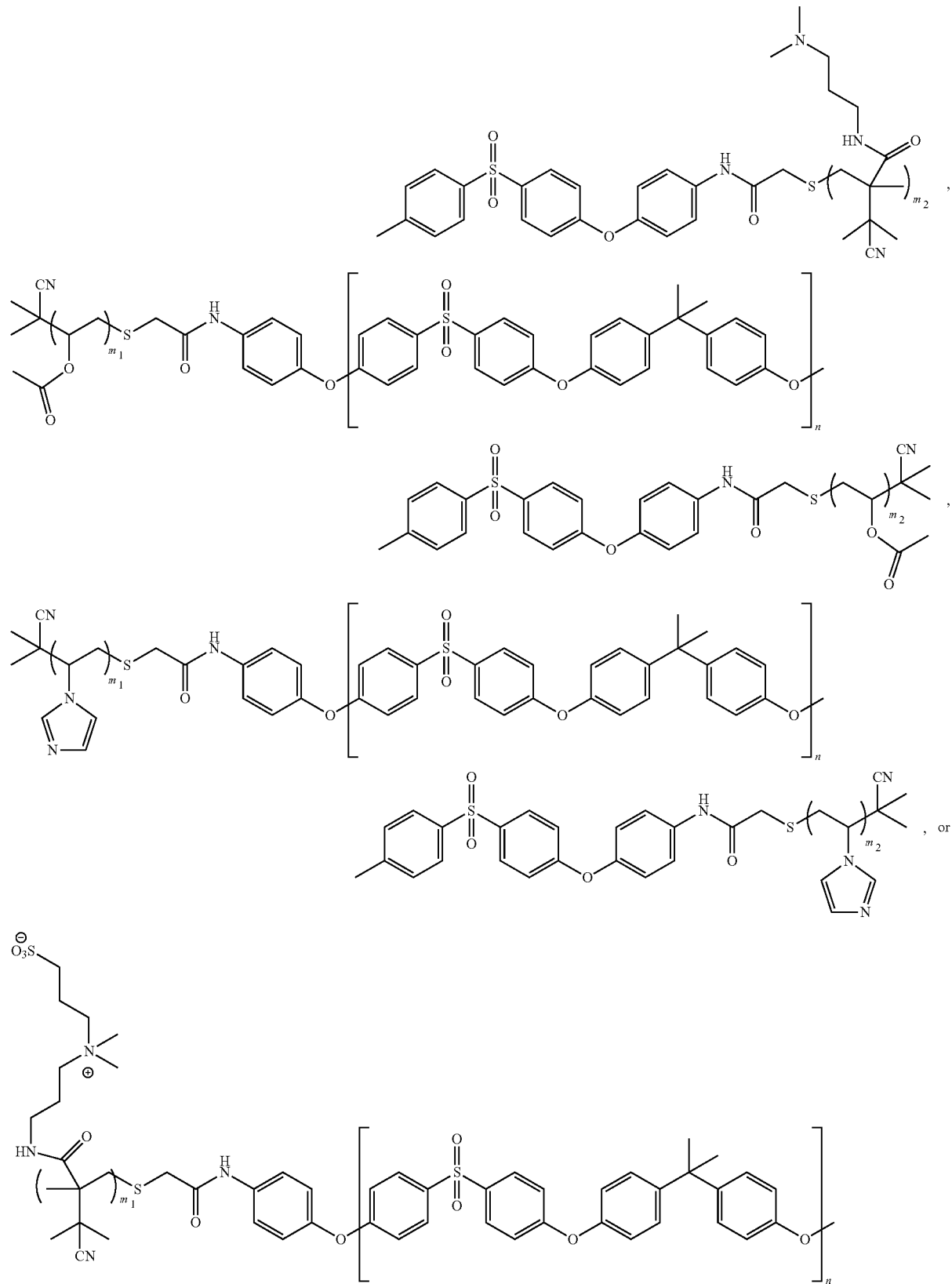

-continued
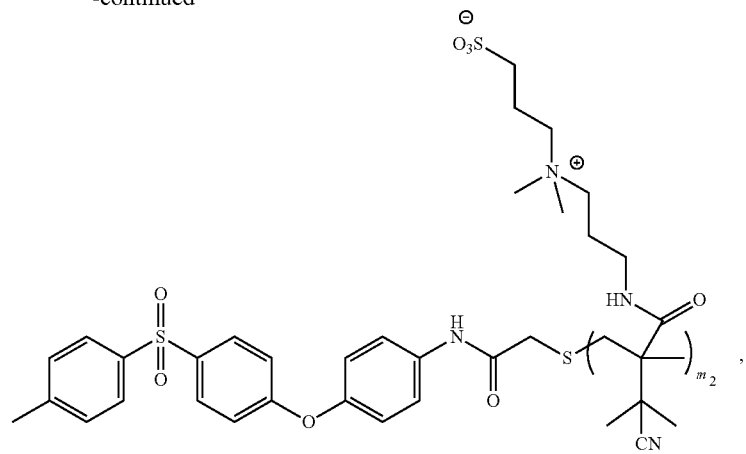
wherein each of $m_1$ and $m_2$ is from about 5 to about 50 and n is from about 20 to about 200.
19. A self-wetting porous membrane prepared by the method of claim 10.
20. A method of filtering a fluid, the method comprising passing the fluid through the self-wetting porous membrane of claim 1.
* * * * *